US009626291B2

(12) United States Patent
Schreter

(10) Patent No.: US 9,626,291 B2
(45) Date of Patent: *Apr. 18, 2017

(54) LOCK-FREE, SCALABLE READ ACCESS TO SHARED DATA STRUCTURES USING GARBAGE COLLECTION

(71) Applicant: Ivan Schreter, Malsch (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,755

(22) Filed: Mar. 10, 2015

(65) Prior Publication Data

US 2015/0186266 A1 Jul. 2, 2015

Related U.S. Application Data

(63) Continuation of application No. 13/770,901, filed on Feb. 19, 2013, now Pat. No. 9,009,203.

(51) Int. Cl.
*G06F 17/30* (2006.01)
*G06F 12/02* (2006.01)

(52) U.S. Cl.
CPC .... *G06F 12/0261* (2013.01); *G06F 17/30303* (2013.01); *G06F 17/30575* (2013.01); *G06F 2212/1048* (2013.01)

(58) Field of Classification Search
CPC ....................................................... G06F 17/30
See application file for complete search history.

(56) References Cited

U.S. PATENT DOCUMENTS

| | | | |
|---|---|---|---|
| 5,280,612 A * | 1/1994 | Lorie | G06F 17/30356 707/999.008 |
| 5,317,731 A | 5/1994 | Dias et al. | |
| 7,089,253 B2 | 8/2006 | Hinshaw et al. | |
| 7,395,383 B2 | 7/2008 | McKenney | |
| 7,581,066 B2 | 8/2009 | Marwinski et al. | |
| 7,640,249 B2 | 12/2009 | Smits | |
| 8,037,112 B2 | 10/2011 | Nath et al. | |
| 8,108,448 B2 | 1/2012 | Siegwart et al. | |
| 8,131,700 B2 | 3/2012 | Zhu et al. | |
| 8,412,688 B1 | 4/2013 | Armangau et al. | |
| 8,442,962 B2 | 5/2013 | Lee et al. | |
| 8,510,281 B2 | 8/2013 | Schwarzmann | |
| 9,208,191 B2 | 12/2015 | Schreter | |

(Continued)

*Primary Examiner* — Khanh Pham
(74) *Attorney, Agent, or Firm* — Mintz Levin Cohn Ferris Glovsky and Popeo P.C.

(57) ABSTRACT

At least one read operation of at least one object of a data container is initiated. The data container includes an anchor object, a first internal data object and a first garbage collection object, the anchor object comprising a pointer to a versioned structure tree. Thereafter, in response to the at least one incompatible write operation, a second internal data object and a second garbage collection object are created for the data container. The second garbage collection object has a reference to the second internal data object. Subsequently, the second internal data object is installed in the anchor object and the first garbage collection object is passed to a garbage collection process so that space used by the first garbage collection object in a database can be reused. Related apparatus, systems, techniques and articles are also described.

21 Claims, 3 Drawing Sheets

(56) References Cited

U.S. PATENT DOCUMENTS

| | | |
|---|---|---|
| 2003/0182465 A1 | 9/2003 | Moir et al. |
| 2006/0173885 A1 | 8/2006 | Moir et al. |
| 2007/0203960 A1* | 8/2007 | Guo .................. G06F 12/0269 |
| | | 707/999.206 |
| 2007/0226685 A1* | 9/2007 | Kaakani ................... G06F 8/67 |
| | | 717/108 |
| 2007/0233683 A1 | 10/2007 | Verma et al. |
| 2008/0183958 A1* | 7/2008 | Cheriton ............ G06F 12/0223 |
| | | 711/108 |
| 2008/0270482 A1* | 10/2008 | Hillberg ............. G06F 12/0253 |
| | | 707/999.2 |
| 2011/0161603 A1 | 6/2011 | Taillefer |
| 2011/0252000 A1* | 10/2011 | Diaconu ........... G06F 17/30501 |
| | | 707/638 |
| 2011/0307450 A1 | 12/2011 | Hahn et al. |
| 2012/0166407 A1 | 6/2012 | Lee et al. |
| 2012/0197944 A1 | 8/2012 | Foti |
| 2012/0254249 A1 | 10/2012 | Starkey |
| 2013/0117247 A1 | 5/2013 | Schreter et al. |
| 2013/0198139 A1 | 8/2013 | Skidanov et al. |
| 2013/0290287 A1 | 10/2013 | Shrinivas et al. |

\* cited by examiner

LOCK-FREE, SCALABLE READ ACCESS TO SHARED DATA STRUCTURES USING GARBAGE COLLECTION

CROSS REFERENCE

This application is a continuation of and claims the benefit of priority under 35 U.S.C. §120 of U.S. patent application Ser. No. 13/770,901 filed Feb. 19, 2013 entitled "Lock-free, Scalable Read Access to Shared Data Structures Using Garbage Collection" the disclosure of which is incorporated herein by reference.

TECHNICAL FIELD

The subject matter described herein relates to techniques providing lock-free and scalable read access to shared structures in a database kernel using garbage collection.

BACKGROUND

Synchronized access to shared data structures is required in many computer programs in order to ensure data consistency of those shared structures. In many cases, such shared structures are relatively seldom modified, but read quite often. In order to ensure data consistency, such structures can be locked using read/write locks that are exclusive for modification for the underlying data and are shared for reading operations. However, read/write locks are not particularly cheap synchronization primitives and even read access can cause L2-cache misses in the CPU, which in turn, can seriously limit performance of multiple-core computing systems.

Such problems can be alleviated but at the cost of (potentially much) higher memory usage for a single read/write lock. In particular, one memory cache line can be reserved for each CPU core so that shared locks in a corresponding core cache line can be counted when there is no exclusive lock request present.

However, with such an arrangement, at least two problems still remain. First, the exclusive access excludes reading of the shared structure until the corresponding operation is completed. This restriction can lead to performance bottlenecks, especially as modern many-core architectures now regularly exceed 100+ CPU cores. In the context of in-memory databases, the problem is even more prominent, because there is no I/O time, which would dominate query execution time. Second, even with optimized read/write locks using one cache line per CPU core, heavy modification load will cause a high ratio of L2 cache misses during exclusive lock waiting. Ideally, shared readers should never be blocked by the modification of internal structures.

SUMMARY

In one aspect, at least one read operation of at least one object of a data container is initiated. The data container includes an anchor object, a first internal data object and a first garbage collection object, the anchor object comprising a pointer to a versioned structure tree. Thereafter, in response to the at least one incompatible write operation, a second internal data object and a second garbage collection object are created for the data container. The second garbage collection object has a reference to the second internal data object. Subsequently, the second internal data object is installed in the anchor object and the first garbage collection object is passed to a garbage collection process so that space used by the first garbage collection object in a database can be reused.

The subject matter described herein can be implemented using a plurality of processor cores. With such variations, the anchor object can also include a stripe per processor core. The processor core stripes include state information for the corresponding processor core such as a reference count and a pointer to a current garbage collection object (with the current garbage collection object being the same for all processor core stripes). For each stripe in the anchor object, the garbage collection process can atomically replace a current reference count and the first garbage collection object with a zero reference count and the second garbage collection object. A total current reference count can be determined by summing reference counts for all stripes in the anchor object. References can be released from the first garbage collection object equal to a number of references corresponding to a number of remaining readers associated with the first garbage collection object plus one.

The second garbage collection object can be linked as a next object to the first garbage collection object. The first internal data object can be a backing array of a dictionary vector in a columnar dictionary object. At least one of the objects can be stored in an in-memory database (e.g., an in-memory read only database, etc.). The database can store data in rows with monotonically-increasing row identifiers. The database can use multi-version concurrency control.

Each of the first garbage collection object and the second collection object can have a predecessor collection object. With such an arrangement, each of the first garbage collection object and the second garbage collection object are initialized such that their respective reference counts are equal to a maximum value. During garbage collection, a value from the reference count is subtracted from each garbage collection object equal to a number of corresponding readers of the at least one object of the data container. If a garbage collection object has not predecessor garbage collection object, then the initial reference value is equal to the maximum value.

Non-transitory computer program products are also described that store computer executable instructions, which, when executed by one or more data processors of at least one computer, causes the at least one computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, with the current subject matter, read operations seeking to access a shared data structure are never blocked, so much better usage of CPU resources is possible, even under heavy table modification load. In addition, garbage collection of only internal data objects ensures pointer stability so that corresponding methods can be easily integrated with legacy code.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
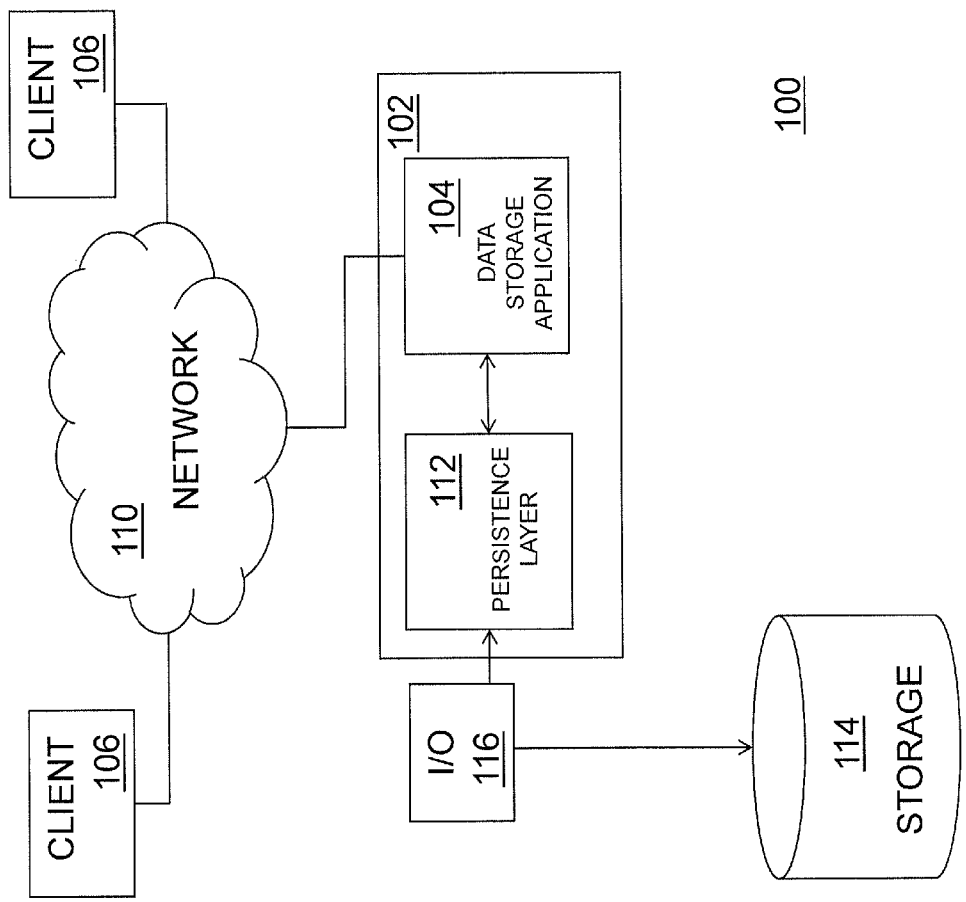
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
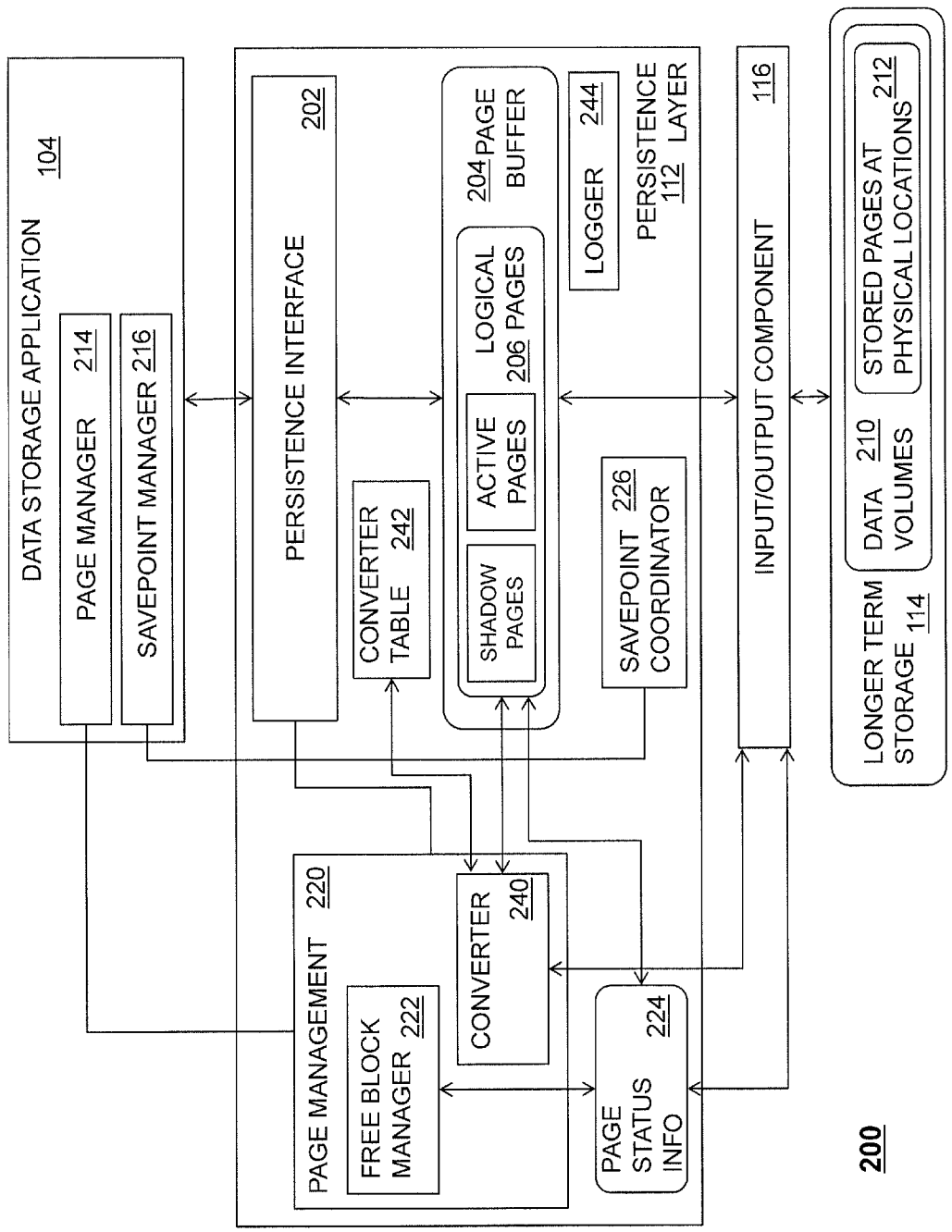
FIG. 2 is a diagram illustrating details of the system of FIG. 1.

FIG. 2 shows a software architecture 200 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 202. A page buffer 204 within the persistence layer 112 can store one or more logical pages 206, and optionally can include shadow pages, active pages, and the like. The logical pages 206 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 210 where stored pages 212 are allocated at physical memory blocks.

In some implementations, the data storage application 104 can include or be otherwise in communication with a page manager 214 and/or a savepoint manager 216. The page manager 214 can communicate with a page management module 220 at the persistence layer 112 that can include a free block manager 222 that monitors page status information 224, for example the status of physical pages within the storage 114 and logical pages in the persistence layer 112 (and optionally in the page buffer 204). The savepoint manager 216 can communicate with a savepoint coordinator 226 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 222 within the page management module 220 can maintain the status of physical pages. The page buffer 204 can included a fixed page status buffer that operates as discussed herein. A converter component 240, which can be part of or in communication with the page management module 220, can be responsible for mapping between logical and physical pages written to the storage 114. The converter 240 can maintain the current mapping of logical pages to the corresponding physical pages in a converter table 242. The converter 240 can maintain a current mapping of logical pages 206 to the corresponding physical pages in one or more converter tables 242. When a logical page 206 is read from storage 114, the storage page to be loaded can be looked up from the one or more converter tables 242 using the converter 240. When a logical page is written to storage 114 the first time after a savepoint, a new free physical page is assigned to the logical page. The free block manager 222 marks the new physical page as "used" and the new mapping is stored in the one or more converter tables 242.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 244 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 244 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 202 can handle read and write requests of stores (e.g., in-memory stores, etc.). The persistence interface 202 can also provide write methods for writing data both with logging and without logging. If the logged write operations are used, the persistence interface 202 invokes the logger 244. In addition, the logger 244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 244. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 244 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 244 can write a database log (or simply referred to herein as a "log") sequentially into a memory buffer in natural order (e.g., sequential order, etc.). If several physical hard disks/storage devices are used to store log data, several log partitions can be defined. Thereafter, the logger 244 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 104 can use shadow paging so that the savepoint manager 216 can write a transactionally-consistent savepoint. With such an arrangement, a data backup comprises a copy of all data pages contained in a particular savepoint, which was done as the first step of the data backup process. The current subject matter can be also applied to other types of data page storage.

The data storage application 104 can utilize multi-version concurrent control (MVCC) for transaction isolation and consistent reading. Each row of the database can be associated with a unique, monotonically-increasing identifier (RowID). When a new version of the record is created, this new version can also become a new RowID (i.e., due to MVCC semantics, old versions must be kept for parallel readers and will be cleaned only during garbage collection after commit).

References herein to pages can refer to pages of a table stored in memory of an in-memory database forming part of the data storage application 104. With the MVCC-based database table implementation, all internal transient data objects of a table can be versioned. These data objects can include table a header object, metadata object(s), other internal state(s) such as vector of loaded pages, dictionary hashes/trees for compressed columnar tables, and the like. In addition, all table control structures used by readers can be versioned. These structures include, for example, page lists, value indirection vectors, internal metadata, and more. Readers do not acquire any locks on data structure, but rather, work with a current version of a data structure until query or query plan operator ends. With this arrangement, old versions only remain for a short period of time (e.g., sub-seconds). As versioned objects are typically small, memory overhead is also small. In addition, even with OLTP systems, incompatible changes are rare (i.e., there are not many concurrent versions, etc.). Moreover, with some implementations, if older versions of prioritized/big objects (e.g., main part of a columnar table, etc.) still exist, no new version of the corresponding object can be created. For example, if there is a reader doing a scan on the main part of a columnar table, which started during columnar table merge from version n−1 to version n, this scan uses main part in version n−1. Even after merge to version n is finished, further merge from version n to version n+1 will be prevented as long as there are any scans running on main part in version n−1 (as this might increase memory demand prohibitively).

The current subject matter can be integrated into database columnar engines that use static pointers for dictionaries and data vectors. Such an integration can be accomplished by only versioning internal data objects of a data container, such as a backing array of a dictionary vector in a columnar dictionary object. When the internal data object of the container is reallocated due to an incompatible change, then the old internal data object is given to a garbage collection process to reclaim memory when it is safe to do so. Various techniques as described herein can be implemented, for example, using one or more aspects described in co-pending application Ser. No. 13/554,967 entitled: "Lock-Free Scalable Read Access to Shared Data Structures" filed on Jul. 20, 2012, the contents of which are hereby fully incorporated by reference.

In order to implement optimal garbage collection, two structures can be utilized, an anchor object and a garbage collection (GC) object. The anchor object can comprise a pointer to a versioned structure tree (not related to garbage collection), and per-core stripes with processor core-specific states including a reference count and a pointer to the current GC object (which is the same for all data processor core stripes). The GC object, on the other hand, can comprise a reference count and a pointer to the next GC object.

Versioned container implementation, such as a versioned vector, can contain a pointer to a GC object in addition to its normal internal data object. This GC object can be allocated when the versioned container is initially constructed. Similarly, the initial GC object can be allocated at the construction time for the anchor object.

Reference count of a GC object can characterize a number of active readers. One reference can be reserved for the reference from a previous (older) GC object. All GC objects can start with the reference counter initialized to MAX. Only an anchor object's GC object reference count can be decremented by one at construction time (because this is the current GC object and there is no older one).

A reader can virtually increment the reference count on the root object of the object hierarchy by incrementing core-specific reference counts on respective stripes. Aside from this reference count, the stripe can also contain also a pointer to the current GC object in the same atomic variable (i.e., the atomic operation at the same time can atomically increment the reference count and reads the current GC object pointer). The GC object pointer can be stored in the reader handle along with the pointer to the current root of the versioned structure tree.

When a writer needs to create a new version of an internal object (such as allocate a new backing array for a growing vector), it can additionally allocate a new GC object. Then, the current GC object and current internal data object of the container can be replaced by the newly-allocated GC object and internal data object either atomically or under a lock (which can be also a container-specific lock). The old GC object (which has a reference to the old internal data object) is passed to a garbage collection process (as a new GC object can then be installed in the anchor object).

The garbage collection process operates on the anchor object. The garbage collection process can perform the following for each new GC object coming in from the writer: (i) a new GC object can be linked as the next object to the current GC object; (ii) for each stripe in the anchor object instance, the GC can atomically replace the current reference count and current GC object with a zero reference count and the new GC object; (iii) reference counts of all stripes can be summed up together in the process to determine total current reference count (which is equal to the number of reader handles having current GC object as their linked GC object); and (iv) (MAX−1−sum of reference counts on stripes) references will be released from the old GC object (i.e., exactly the number of references corresponding to the number of readers remain, plus one reference from the old GC object, if any).

In addition, in order to make garbage collection lock-free, an atomic single-in-all-out (SIAO) queue-like concept can be used to queue parallel GC requests and execute them by the thread, which first entered garbage collection. With SIAO, many workers can put objects into the queue, which is internally maintained as LIFO with a flag in same atomic variable as pointer to LIFO head. Then, there is exactly one worker, which atomically removes all elements, but leaving "element present" flag in the queue. After the worker processes all elements, it will either change "element presents" flag to false, if no new elements accumulated, or it will process elements enqueued into the queue in the meantime. Garbage collection as used herein can work the same. If the first element is enqueued and "element present" flag was not set, it will simply do the GC immediately. If at the end of GC some other thread enqueued an element, it will execute GC on behalf of that thread. This allows completely lock-free operation of the GC.

Now, the readers have to release references, when they are done. Typically, there is no GC-relevant change between reader start and finish. In this case, releasing the reader (handle) can be a simple atomic operation, which can decrement the reference count of the anchor object's stripe, while also checking for unchanged GC object pointer. The GC pointer being changed can indicate that a GC-relevant operation was executed during the lifetime of the corresponding reader. In this case, instead of decrementing stripe's reference count, the reference count on the GC object can be decreased.

When the reference count of GC object reaches zero, it can decrement the reference count on the next GC object in the linked chain, deallocate the internal data object of the next GC object, and then the GC object can deallocate itself. In this way, the GC object can be released if these two conditions were met (i) all readers referring to this GC object (i.e., reading old data still held in memory by the next GC object) have completed; and (ii) the previous GC object is already released (i.e., all older readers, which potentially read old data held in memory by previous and this GC object, are now completed). The data of the next GC object can be deallocated because the chain of GC objects is shifted by one GC object. As noted above, the GC object pointer in the anchor object instance can be initialized with an initial current GC object and replaced with the new one on GC of a certain internal data object. With this arrangement, the previous GC object in chain can contain the reference count pertaining to the old internal data object held by the current GC object. Therefore, the internal data object of the next GC object can be released at the time a GC object is released.

Using this mechanism, old internal data objects can be deallocated as soon as all readers are done, which were active at the time the GC object was registered with the anchor. This is also the earliest point in time, when it is safe to deallocate old internal data objects.

As the database can use MVCC to access database table data, the database can read the same data set from both old as well as new data structures. Care must be only taken to order writes and reads in such a way as to ensure consistent dirty read of internal structures (such as, write to the vector first writes new element and then increases element count, reader, on the other hand, first reads count, then accesses elements).

Figure 3:
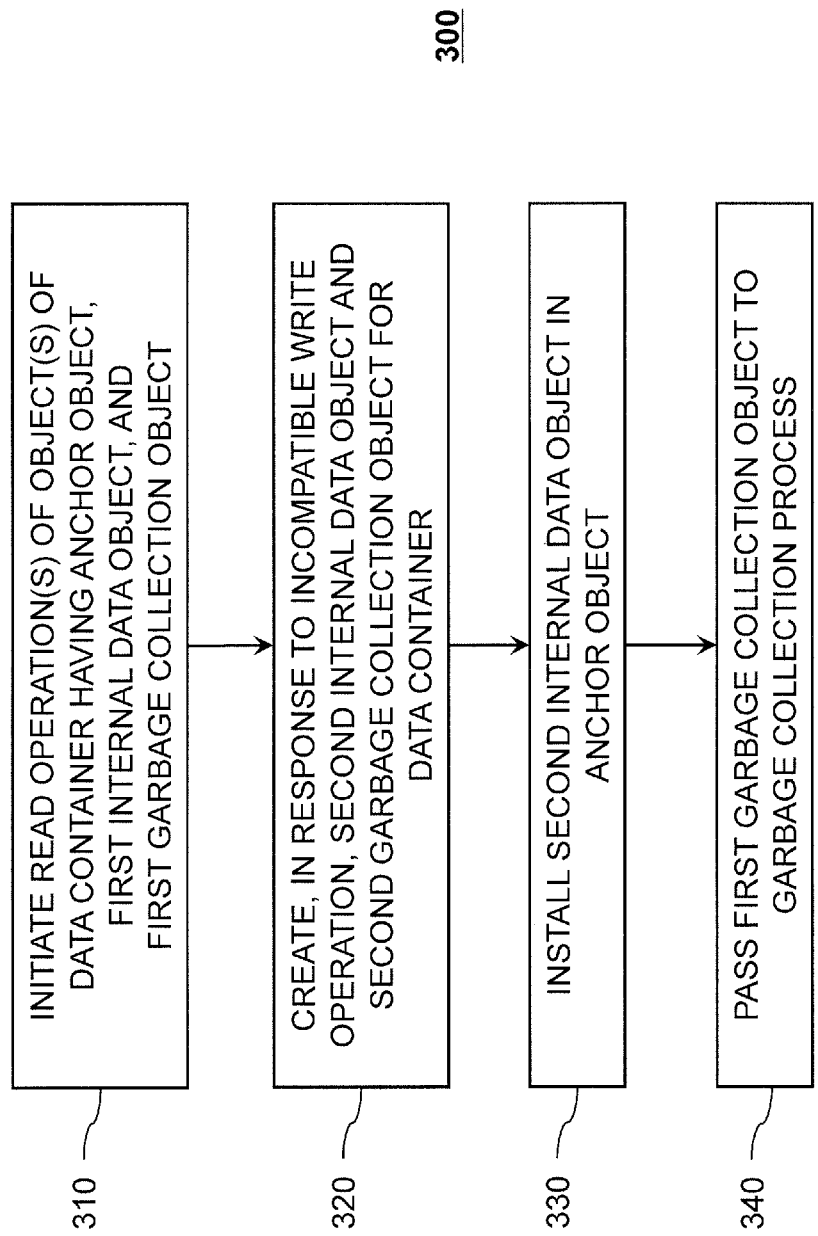
FIG. 3 is a process flow diagram illustrating lock-free, scalable read access to shared data structures using garbage collection.

FIG. 3 is a process flow diagram 300 illustrating a method in which, at 310, at least one read operation of at least one object of a data container is initiated. The data container includes an anchor object, a first internal data object and a first garbage collection object, the anchor object comprising a pointer to a versioned structure tree. Thereafter, at 320, in response at least one incompatible operation, a second internal data object and a second garbage collection object are created for the data container. The second garbage collection object has a reference to the second internal data object. Next, at 330, the second internal data object is installed in the anchor object. The first garbage collection object is then, at 340, passed to a garbage collection process so that space used by the first garbage collection object in a database can be reused.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A method comprising:
   initiating at least one read operation on at least one object of a data container, the data container comprising an anchor object, a first internal data object, and a first garbage collection object, the at least one read operation being initiated on the first internal data object;
   creating, in response to at least one incompatible write operation on the at least one object, a second internal data object and a second garbage collection object for the data container, the at least one incompatible write operation being performed on the second internal data object;
   installing the second internal data object in the anchor object; and
   passing the first garbage collection object to a garbage collection process that reclaims space used by the first internal data object.

2. A method as in claim 1, wherein the method is implemented using a plurality of processor cores and the anchor object further comprises: a stripe per processor core.

3. A method as in claim 2, wherein the processor core stripes comprise state information for the corresponding processor core.

4. A method as in claim 3, wherein the state information comprises a reference count and a pointer to a current garbage collection object, the current garbage collection object being the same for all processor core stripes.

5. A method as in claim 2, wherein, for each stripe in the anchor object, the garbage collection process will atomically replace a current reference count and the first garbage collection object with a zero reference count and the second garbage collection object.

6. A method as in claim 5, further comprising:
   determining a total current reference count by summing reference counts for all stripes in the anchor object.

7. A method as in claim 6, further comprising:
   releasing references from the first garbage collection object equal to a number of references corresponding to a number of remaining readers associated with the first garbage collection object plus one.

8. A method as in claim 1, wherein the second garbage collection object is linked as a next object to the first garbage collection object.

9. A method as in claim 1, wherein the first internal data object is a backing array of a dictionary vector in a columnar dictionary object.

10. A method as in claim 1, wherein at least one of the objects is stored in an in-memory database.

11. A method as in claim 10, wherein the database stores data in rows with monotonically-increasing row identifiers.

12. A method as in claim 11, wherein the database uses multi-version concurrency control.

13. A method as in claim 1, wherein each of the first garbage collection object and the second collection object each have a predecessor collection object, wherein the method further comprises:
   initializing each of the first garbage collection object and the second garbage collection object such that their respective reference counts are equal to a maximum value; and
   subtracting, from each garbage collection object during garbage collection, a value from the reference count equal to a number of corresponding readers of the at least one object of the data container.

14. A method as in claim 1, wherein the first garbage collection object has no predecessor garbage collection object and an initial reference count for the garbage collection object is equal to a maximum value.

15. A method as in claim 1, wherein the anchor object comprises a pointer to a versioned structure tree.

16. A method as in claim 1, wherein the first garbage collection object includes a reference to the first internal data object and the second garbage collection object includes a reference to the second internal data object.

17. A method as in claim 1, wherein the garbage collection process reclaims the space used by the first internal data object when a reference count associated with the first internal data object indicates a completion of all read operations on the at least one object.

18. A non-transitory computer program product storing instructions, which when executed by at least one multi-core data processor comprising at least one computing device, result in operations comprising:
   initiating at least one read operation on at least one object of a data container, the data container comprising an anchor object, a first internal data object, and a first garbage collection object, the at least one read operation being initiated on the first internal data object;
   creating, in response to at least one incompatible write operation on the at least one object, a second internal data object and a second garbage collection object for the data container, the at least one incompatible write operation being performed on the second internal data object;
   installing the second internal data object in the anchor object; and
   passing the first garbage collection object to a garbage collection process that reclaims space used by the first internal data object upon completion of the at least one read operation.

19. A computer program product as in claim 18, wherein:
   the anchor object further comprises a stripe per processor core.

20. A computer program product as in claim 19, wherein, for each stripe in the anchor object, the garbage collection process will atomically replace a current reference count and the first garbage collection object with a zero reference count and the second garbage collection object.

21. A computer program product as in claim 20, wherein the operations further comprise:
   determining a total current reference count by summing reference counts for all stripes in the anchor object;
   releasing references from the first garbage collection object equal to a number of references corresponding to a number of remaining readers associated with the first garbage collection object plus one.

* * * * *